United States Patent [19]

Grossfield

[11] 4,057,794

[45] Nov. 8, 1977

[54] CALLING AIDS

[75] Inventor: Karl Grossfield, London, England

[73] Assignee: National Research Development Corporation, London, England

[21] Appl. No.: 564,652

[22] Filed: Apr. 2, 1975

[30] Foreign Application Priority Data

Apr. 4, 1974 United Kingdom ............... 14968/74

[51] Int. Cl.$^2$ ............................................ H04M 11/02

[52] U.S. Cl. ...................................... 340/311; 174/67; 200/333; 325/118; 325/119

[58] Field of Search ................ 340/311; 325/119, 118; 200/333

[56] References Cited

U.S. PATENT DOCUMENTS

| | | | |
|---|---|---|---|
| 2,565,523 | 8/1951 | Russell | 325/119 |
| 3,296,404 | 1/1967 | Stevens | 200/333 |
| 3,493,934 | 2/1970 | French | 340/311 |
| 3,623,064 | 11/1971 | Kagan | 340/311 |

*Primary Examiner*—Thomas B. Habecker

*Attorney, Agent, or Firm*—Cushman, Darby & Cushman

[57] ABSTRACT

A pocket-size portable transmitter in an emergency call transmission system for geriatric persons has an actuator including a simple switch part such as a push button and a simple cover part movable between a normal closed position covering the switch to prevent accidental actuation and an open position exposing the switch for actuation. In a preferred system a plurality of transmitters are inductively coupled with respective receivers distributed to determine separate areas for use of the transmitters, the transmitters producing multi-element code sequence signals to avoid false alarms from outside interference, and the receivers having wired connections to a central alarm indicator assembly.

6 Claims, 3 Drawing Figures

CALLING AIDS

Figure 1:
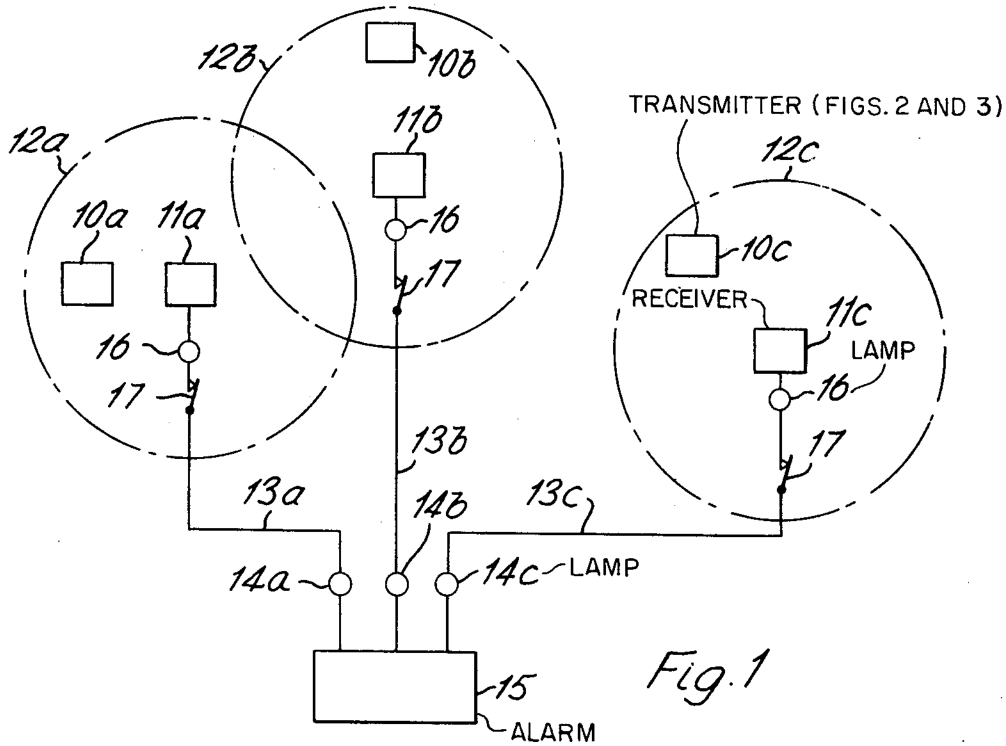

The risk that elderly and disabled people may get into an emergency situation, such as by falling, in which they require assistance but are inable to call for it, is widely appreciated and many systems have been proposed to deal with this problem. However, none of the systems so far proposed have proved satisfactory from a more general point of view.

One class of such systems includes a transmitter to be carried by the person at risk and, in the event of an emergency, that person actuates the transmitter to activate an alarm by way of a co-operating receiver. This class of system usually employs a permanently exposed push button or equivalent simple switch for actuating the transmitter because it has been thought that the person requiring assistance might be confused as a result of the relevant emergency and that accordingly the transmitter actuation should be a simple as possible. However, in practice this class of device has proved unattractive to prospective users because false alarms are easily generated by inadvertent actuation of the transmitter. This stems from a serious psychological factor in that the prospective users will accept the benefit of a device which enables a call for assistance to be made when required, but they will not accept the embarrassment of any significant incidence of false alarms. Moreover, experience leading to development of the present invention has shown that a surprisingly low incidence of false alarms is significant in this last respect.

An object of the present invention is to reduce the difficulties of this situation and it is accordingly proposed that the transmitter actuator comprises a switch part operable to actuate the transmitter, and a cover part movable between two positions in which it respectively covers and exposes the switch part.

The proposed actuator mechanism is advantageous in normally covering the switch part to prevent inadvertent operation, while allowing exposure of the switch part for a required operation, and the cover part can be of a simple form which is easily 'opened' so as to retain the desired ease of transmitter actuation. Development of the invention to date has led to a preferred transmitter form in which the actuator mechanism comprises a push button switch surrounded by an annular wall with a snap-fit lid hinged thereon.

A further consideration arises from the fact that the class of systems in question usually involves the provision of a plurality of transmitters associated with a centrally located receiver, with the transmitters being of a form which generate respective uniquely coded signals and the receiver having a code detector and respective indicators so that the user of an acutated transmitter can be identified. However, such a system does not identify the location of the person requiring assistance.

Now there will be many situations in which it is only necessary to provide an emergency call facility for a person within a relatively small area. For example, persons in a block of apartments will require this facility mostly when in their own apartments since at other times they will normally be within view of other persons who can render, or call for, assistance. Accordingly, a preferred system involves the provision of a transmitter operable within a short range of an individual receiver which has a wired connection to a centrally located alarm. In this instance, actuation of the receiver per se rather than a code identifies the person requiring assistance, and at the same time the location of that person is identified as being within a small area centred on the receiver. In practice it is still appropriate to employ a coded transmission signal, but this is for reasons of avoiding false alarm generation by external electrical interference. This is particularly relevant to the use of inductive transmitter-receiver coupling which is preferred to closely determine transmission range, and also to a situation where one receiver may be within the range of two or more transmitters.

Development of the invention to date indicates that coding for the relevant purpose is preferably of a multi-element sequence form.

Figure 2:
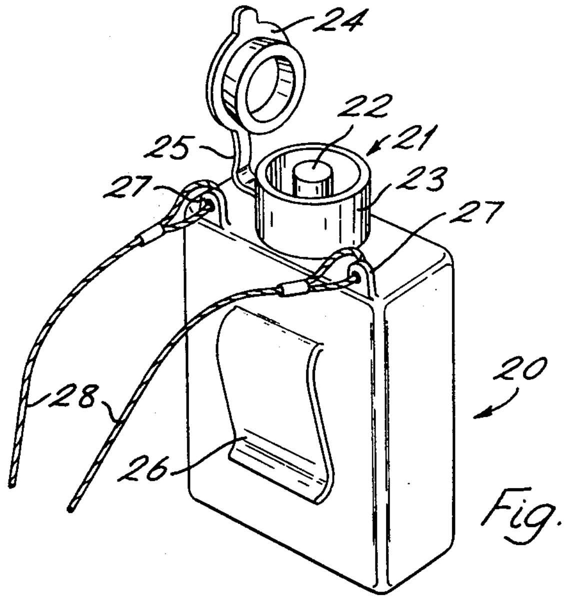
Figure 3:
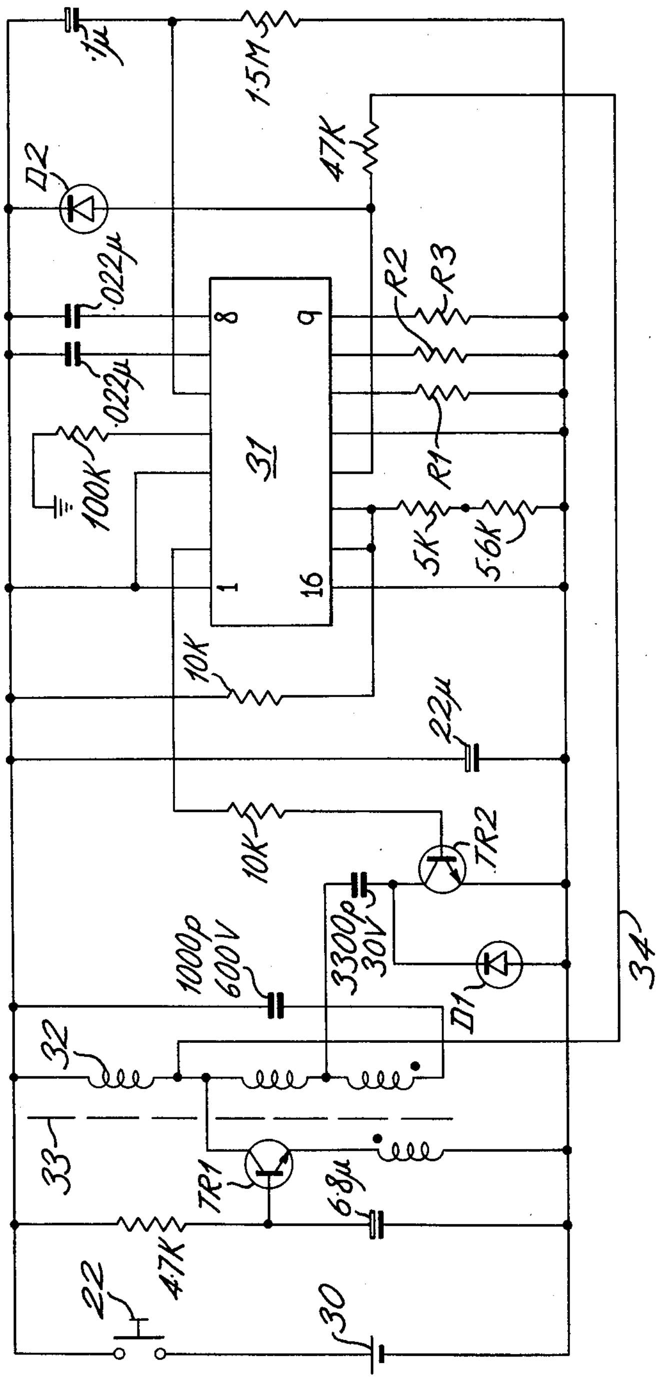

In order that the invention may be more fully understood and readily carried into effect, the same will now be described, by way of example, with reference to the accompanying drawings, in which:

FIG. 1 schematically illustrates an emergency calling system according to the invention, FIG. 2 diagrammatically illustrates in an external view one transmitter of the system of FIG. 1, and FIG. 3 illustrates the electrical circuit of the transmitter of FIG. 2.

The system of FIG. 1 comprises a plurality of transmitters 10*a*, 10*b*, and so on, which are each similar in being of small, readily portable, coded electrical transmission signal form. Each transmitter is inductively coupled with a respective receiver 11*a*, 11*b*, etcetera, having an appropriate code detector, the receivers being separately located within respective areas 12*a*, 12*b*, etcetera, within which actuation of the transmitter will operate the receiver. Each receiver has a respective wired connection 13*a*, 13*b*, etcetera, to an individual indicator lamp 14*a*, 14*b*, etcetera, and a common alarm bell 15, which lamps and bell are located together for supervision by a warden. Additionally, it is preferred that each receiver has a respective indicator lamp 16 located adjacent thereto, and that each receiver-alarm connection incorporates a switch 17 adjacent to the receiver.

The coding of each transmitter, as noted above, is such as to avoid activation of its receiver by external interference. In particular, the codes for any transmitters such as 10*a*, and 10*b* which can be carried within range of each others receivers 11*b* and 11*a*, should be mutually exclusive, but this does not necessarily apply to a transmitter such as 10*c*. This is advantageous in reducing the complexity of coding, and consequent increase in costs and transmitter size, in an extensive system.

In use of the system, actuation of a transmitter activates its receiver and thereby sounds the alarm to alert the warden. The warden can identify the person requiring assistance by reference to the centrally located indicator lamp and will know that the person in question is located within a closely specified area. The indicator lamp adjacent the relevant receiver can reassure the person requiring assistance that his call has in fact been made, and additionally allows local verification to be made that the relevant transmitter-receiver combination is operable for the purposes of routine testing. Moreover, it is desirable that routine testing should be possible without sounding the alarm, and each combination can be isolated for test purposes by use of the relevant switch. As an additional feature the receivers can be adapted to latch on when activated so that the alarm is maintained after transmitter actuation.

Considering the presently developed form of transmitter in more detail: the transmitter actuator mechanism and other more general features are shown by FIG. 2. The overall shape of the device is that of a generally rectangular box 20 carrying an actuator mechanism 21 at one end thereof. The mechanism 21, as noted earlier, comprises a switch part and a cover part. In this instance the switch part is of push-button type with the button being denoted at 22 projecting from one end of the box 20. The cover part in this instance includes an annular wall 23 projecting from the box 20 to surround and extend beyond the button 22. A lid 24 is connected to the wall 23 by a hinge 25, so that the button can be covered against accidental operation or exposed for a required operation. Conveniently the wall, lid and hinge of the cover part are of integral construction in plastics material with the lid and wall being formed to provide a snap fit therebetween.

It has been noted that the transmitter should be readily portable and a suitably small size for this purpose can be attained by the use of integrated circuits and battery operation. For example, the present developed device has an overall size of approximately 6×4×1.5 cms. which is significantly smaller than a conventional 'crush-proof' cigarette packet and is easily carried in a pocket. Since stowage in a pocket may not be appropriate in all circumstances, and such stowage may render access difficult to the user in an emergency, it is preferable to make provision for carriage of the transmitter in an alternative manner. The box of the presently developed device is accordingly formed with a clip 26 whereby the transmitter can be carried on a belt or on the outside of a pocket. Also, the box is formed with two flanges 27 which are apertured for connection of a cord or strap 28 whereby the device can be hung from the user's neck or shoulder, or strapped around the user's waist.

It is also appropriate to take account of possible damage to the device and more particularly the electronic components thereof, such as by dropping of the same. For this purpose, it is preferred that the electronic components be encapsulated. This can serve to separate such components from the battery to avoid possible damage to the former by movement of the latter within the box due to shaking or vibration. Alternatively, the whole contents of the box 20 can be filled with 'potting' resin to provide a very rugged device which is disposable when the battery has expired (this can represent several years life).

Turning now to the circuit of FIG. 3, which is that of the presently developed transmitter: this circuit comprises a multi-element code sequence generator which controls a modulator for a transmitter oscillator; the generator, modulator and oscillator being energised through the push button 22, when actuated, by a battery 30. More particularly, the generator comprises an integrated circuit 31 (type FX107 Consumer Microcircuits Limited) which produces a three-tone sequence, each tone being determined by a respective one of resistors R1, R2 and R3, and each such resistor being one of a plurality (in this instance five) predetermined values determining respectively different frequencies. The oscillator comprises transistor TR1 (type BFS60) and the adjacent coils 32 which are wound around a ferrite rod aerial 33, and the modulator comprises transistor TR2 (type BFS60).

In operation, energisation by actuation of the push button causes the generator to produce its three tone sequence and the tone signal is applied to the base of the modulator transistor to switch the latter on and off at the successive tone frequencies. Switching of the modulator transistor causes change of the oscillator frequency between two different frequencies and so the oscillator transmission signal output is frequency modulated in accordance with the relevant coded tone sequence. It is clearly desirable that the coded transmission signal be produced throughout the period during which the push button is actuated and, since the presently employed generator integrated circuit normally operates when energised to produce a single tone sequence, a feedback connection 34 is taken from the oscillator output to the generator so that the latter is repeatedly triggered. This triggering connection is advantageous compared to the otherwise normal alternative of providing a clock pulse generator with the attendant increase in size of transmitter circuit.

For completeness in connection with FIG. 3 it remains to note that component types and values not indicated above or in the drawings are as follows: diodes D1 and D2 are of respective types IN916 and CV7128; the five values for resistors R1, R2 and R3 are 300, 240, 200, 180 and 150K to provide respective tone frequencies of 113, 142, 171, 190 and 228Hz; and the oscillator frequency modulates between 96.5 and 97.5K Hz.

While the invention has been described with more particular reference to the illustrated presently developed embodiment, it will be appreciated that this is by way of example. No detailed circuit description has been given for an associated receiver in an overall system since the constraints of size for portability are not relevant and the receiver can be of any suitable design according to known art. However, the receiver should be as simple as reasonably possible for the purposes of economy and it is to be noted in this respect that the particular integrated circuit mentioned above can be used in a code detector function.

Variation can be made in the transmitter device in respect of the actuator mechanism which may be extended to cover one end of the device to simplify the overall shape of the device and allow a maximum size of push button to be employed, and the mechanism may employ a sliding cover part rather than a hinged part. Also the transmitter code can be of other forms, such as a multi-element digital sequence.

Lastly, while a system such as that of FIG. 1 with distributed receivers is preferred for many circumstances, some circumstances may be better dealt with by central location of the receivers. This may suit a compact site such as a single building, and in this case an inductive loop aerial for the receivers can be arranged around the relevant building.

We claim:

1. An emergency-call transmission system, comprising:

a. a plurality of similar indirectly-coupled transmission sub-systems which each include a portable transmitter to be carried by an individual person at risk, and a stationary sited receiver, each said transmitter having a housing and an actuator mechanism which includes a switch part and a cover part integrally associated with said housing, said cover part being movable between a first position in which it covers the switch part and renders the same non-actuable and another position in which it exposes the switch part for actuation, each said transmitter including a transmission signal generator of multi-element code sequence form, each said receiver including a detector for said code sequence of the respective sub-system transmitter, and each said receiver being separately located to define an individual zone of effectiveness for said respective transmitter; and b. a stationary sited monitor unit including a plurality of first call indicators respectively directly connected to said receivers and operable therewith in response to said respective transmitters.

2. A system according to claim 1 wherein said first indicators are of visual form, said monitor unit further comprises a common audible alarm directly operably connected with each said receiver, and said system further comprises a plurality of second call indicators located adjacent and directly operably connected with respective ones of said receivers.

3. A system according to claim 1 wherein said switch part is of push button type and said cover is of snap-connection type.

4. A system according to claim 3 wherein said cover part includes an annular wall surrounding said push button, and a lid hinged to and adapted for snap-fit engagement with said wall.

5. A system according to claim 1, wherein each said transmitter includes an external casing having a clip connected thereto for supporting said casing on an article of clothing, and an elongate flexible member connected to said casing to form a loop for carriage of said casing.

6. A system according to claim 1 wherein said generator is of multi-tone code sequence form.

* * * * *